(12) United States Patent
Hassani et al.

(10) Patent No.: US 9,771,071 B2
(45) Date of Patent: Sep. 26, 2017

(54) DYNAMIC LANE POSITIONING FOR IMPROVED BIKER SAFETY

(71) Applicant: FORD GLOBAL TECHNOLOGIES, LLC, Dearborn, MI (US)

(72) Inventors: Ali Hassani, Ann Arbor, MI (US); Jakob Nikolaus Hoellerbauer, Canton, MI (US); Arun Dutta, Ann Arbor, MI (US); Alexander Groh, Detroit, MI (US); Pol Llado, Canton, MI (US); John William Schmotzer, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 126 days.

(21) Appl. No.: 14/945,513

(22) Filed: Nov. 19, 2015

(65) Prior Publication Data

US 2017/0144657 A1 May 25, 2017

(51) Int. Cl.
*B60W 30/09* (2012.01)
*B60W 30/095* (2012.01)
(Continued)

(52) U.S. Cl.
CPC ............ *B60W 30/09* (2013.01); *B60W 10/18* (2013.01); *B60W 10/20* (2013.01); *B60W 30/0953* (2013.01); *B60W 30/0956* (2013.01); *B60W 2520/10* (2013.01); *B60W 2550/30* (2013.01); *B60W 2710/18* (2013.01);
(Continued)

(58) Field of Classification Search
CPC ............ B60W 30/09; B60W 30/0953; B60W 30/0956; B60W 10/18; B60W 10/20; B60W 2520/10; B60W 2550/30; B60W 2710/18; B60W 2710/20; B60W 2900/00; B60W 2710/30
See application file for complete search history.

(56) References Cited

U.S. PATENT DOCUMENTS 8,473,144 B1 6/2013 Dolgov et al.
8,838,372 B2 * 9/2014 Noda .................... G08G 1/166
340/903

(Continued)

FOREIGN PATENT DOCUMENTS

CN 102785661 A 11/2012
JP 2008282326 A 11/2008
(Continued)

OTHER PUBLICATIONS

Great Britain Search Report dated May 16, 2017 for Great Britain Application No. GB1619469.8, 5 pgs.

*Primary Examiner* — Richard Camby
(74) *Attorney, Agent, or Firm* — Frank A. MacKenzie; Brooks Kushman P.C.

(57) ABSTRACT

A vehicle includes a steering wheel and a controller. The controller is configured to, in response to receiving location and speed data from other vehicles indicating an expected collision absent a trajectory change, automatically control the steering wheel to direct the vehicle along a collision avoidance path. The collision avoidance path is based on map data identifying a marking type for a traveling lane such that the path crosses the lane when the marking type is broken and does not cross the lane when the marking type is solid.

15 Claims, 3 Drawing Sheets

(51) Int. Cl.
*B60W 10/18* (2012.01)
*B60W 10/20* (2006.01)

(52) U.S. Cl.
CPC ..... *B60W 2710/20* (2013.01); *B60W 2710/30* (2013.01); *B60W 2900/00* (2013.01)

(56) References Cited

U.S. PATENT DOCUMENTS

| | | | |
|---|---|---|---|
| 9,048,960 B2 | 6/2015 | Li et al. | |
| 9,245,448 B2 * | 1/2016 | Schofield | B60Q 1/346 |
| 9,273,971 B2 * | 3/2016 | Noh | G01C 21/28 |
| 2011/0234390 A1 | 9/2011 | Danner et al. | |
| 2013/0127638 A1 | 5/2013 | Harrison | |
| 2013/0321615 A1 | 12/2013 | Schofield | |
| 2015/0151725 A1 | 6/2015 | Clarke et al. | |

FOREIGN PATENT DOCUMENTS

| | | | |
|---|---|---|---|
| JP | 2008307951 A | 12/2008 | |
| WO | 2012080799 A1 | 6/2012 | |

\* cited by examiner

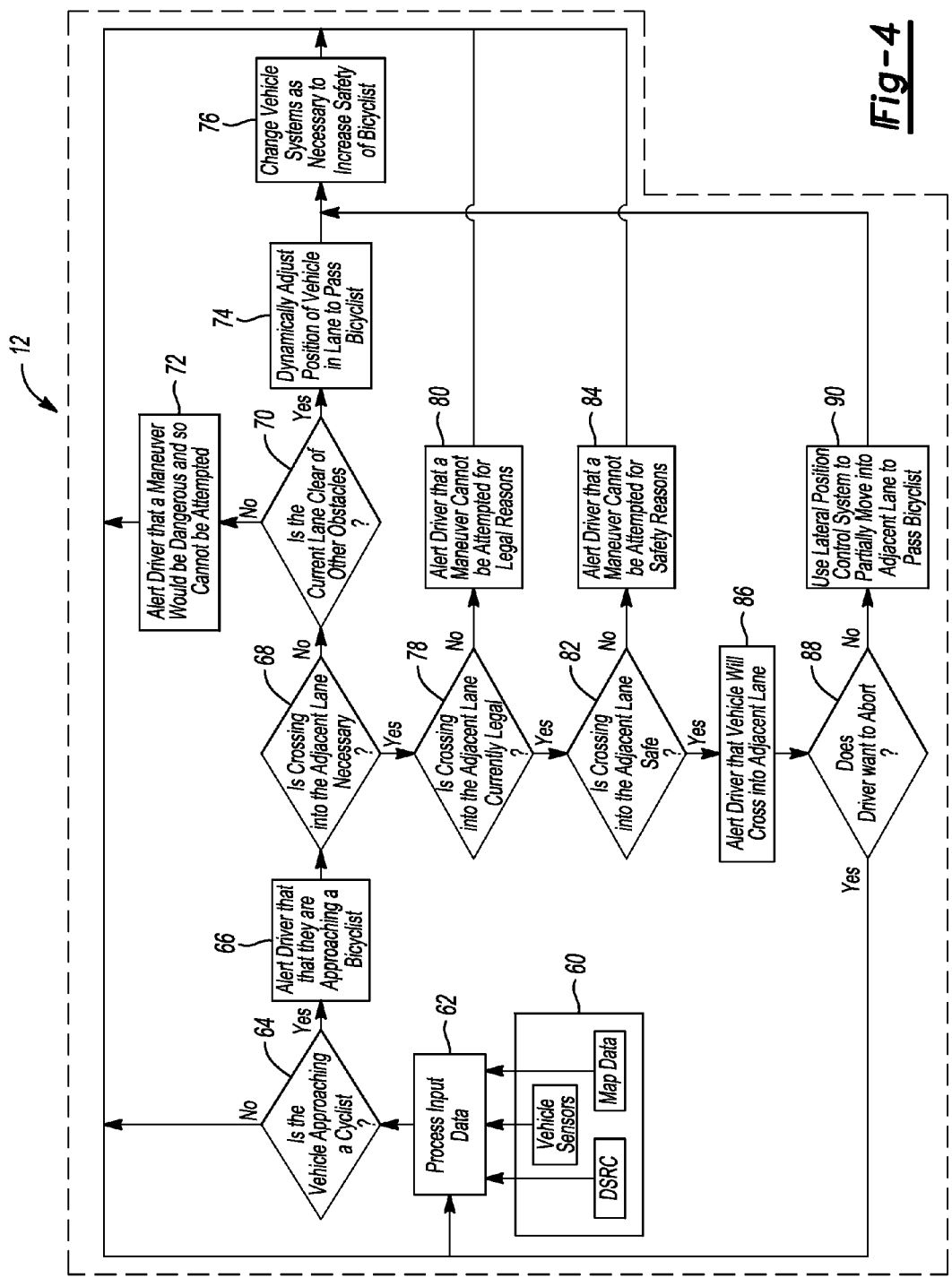

DYNAMIC LANE POSITIONING FOR IMPROVED BIKER SAFETY

TECHNICAL FIELD

The present disclosure relates to collision avoidance systems for vehicles.

BACKGROUND

Vehicles may use dedicated short range communication to exchange information with other vehicles, roadway infrastructure, or other objects traveling on the roadway such as cyclists. The collision avoidance system for a vehicle may use this information to avoid obstacles, determine roadway conditions, or find alternate routes through traffic. Collision avoidance systems may also communicate information exchanged using dedicated short range communication to other vehicle control systems to aid in efficiently operating the vehicle.

SUMMARY

A system includes a controller. The controller is configured to, in response to receiving location and speed data from other vehicles indicating an expected collision absent a trajectory change, steer a vehicle to avoid the collision on a path. The path is based on map data identifying a marking type for a traveling lane such that the path crosses the lane when the marking type is broken and does not cross the lane when the marking type is solid.

A vehicle includes a steering wheel and a controller. The controller is configured to, in response to receiving location and speed data from other vehicles indicating an expected collision absent a trajectory change, automatically control the steering wheel to direct the vehicle along a collision avoidance path. The collision avoidance path is based on map data identifying a marking type for a traveling lane such that the path crosses the lane when the marking type is broken and does not cross the lane when the marking type is solid.

A control method for a vehicle includes, in response to receiving data from other vehicles indicating an expected collision absent a trajectory change, automatically steering the vehicle to avoid the collision on a path. The path is based on data identifying a marking type for a traveling lane such that the path crosses the lane when the marking type is broken and does not cross the lane when the marking type is solid.

BRIEF DESCRIPTION OF THE DRAWINGS

FIG. 4 is a flowchart depicting the control logic of the collision avoidance system.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
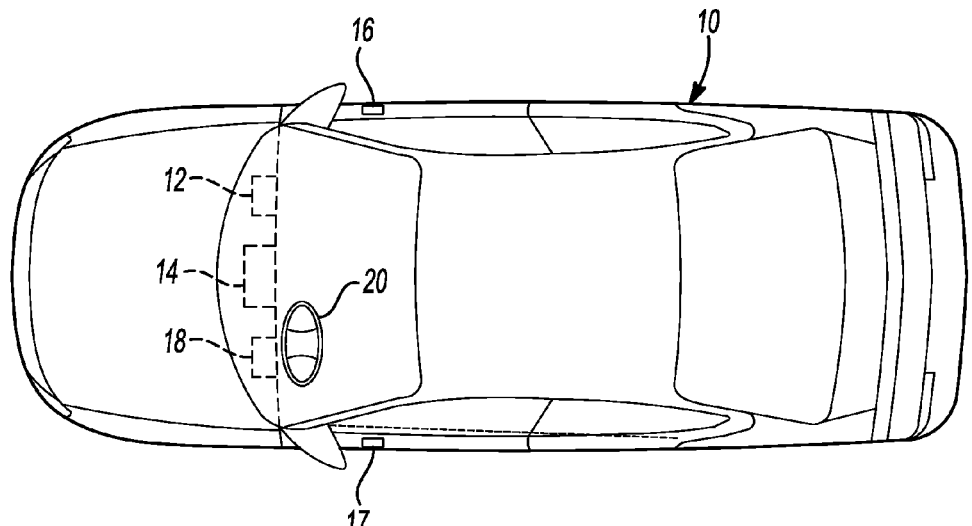
FIG. 1 is a diagrammatic view of a vehicle having a collision avoidance system.

FIG. 1 depicts a vehicle 10 having a collision avoidance system 12. The collision avoidance system 12 may instruct a controller 14 in communication with a communication transceiver 16. The communication transceiver 16 may be configured to send and receive information indicative of the location of the vehicle 10, the speed of the vehicle 10, and a potential trajectory of the vehicle 10. In at least one embodiment, the transceiver 16 may be a dedicated short range communication transceiver. The communication transceiver 16 may also use information exchange networks such as, but not limited to, Bluetooth, Wi-Fi, or any other vehicle information exchange communication system. The dedicated short range communication transceiver 16 may allow for communication from vehicle-to-vehicle (V2V), or from vehicle-to-everything (V2X) including roadway infrastructure, cyclists, or any other object that utilizes a communication transceiver 16.

As will be described with more detail below, objects such as cyclists may produce unique obstacles for occupants on a roadway. Having a collision avoidance system 12 able to communicate information received from a communication transceiver 16 with a vehicle controller 14 allows for improved communication between vehicles that share the roadway and objects on the roadway. Improved communication between vehicles and objects on the roadway further aids in preventing impact events. For example, as will be described with reference to the other figures, a cyclist (not shown) may occupy a vehicle lane (not shown). The collision avoidance system 12 may use a navigation system 18 as well as a vision system 17 to exchange information, via the communication transceiver 16, with the cyclist. The vision system 17 may use onboard cameras, ultrasonic sensors, or any other sensor that may detect vehicle surroundings. The vision system 17 may use the cameras and the ultrasonic sensors either individually or simultaneously to accurately depict the surroundings of the vehicle. The navigation system 18 may use map data and global positioning system data to transfer information such as vehicle speed, vehicle trajectory, and the roadway environment.

The collision avoidance system 12 uses the information transfer from the communication transceiver 16 and the vision system 17 and navigation system 18 to improve performance of the vehicle 10. The collision avoidance system 12 communicates the information to the controller 14 in order to alert an occupant of an oncoming object, such as a cyclist, adjust the vehicle trajectory to compensate for the cyclist, or alter vehicle components, such as a brake pedal position, to adjust a vehicle position relative to the cyclist. The collision avoidance system 12 may instruct the controller 14 to adjust other vehicle systems either individually, or simultaneously as the circumstances require. The controller 14 may be configured to adjust any vehicle system, such as a steering system 20 that may aid in improving performance of the vehicle 10 based on the information received from the communication transceiver 16 of the cyclist's position, speed, or trajectory.

Figure 2:
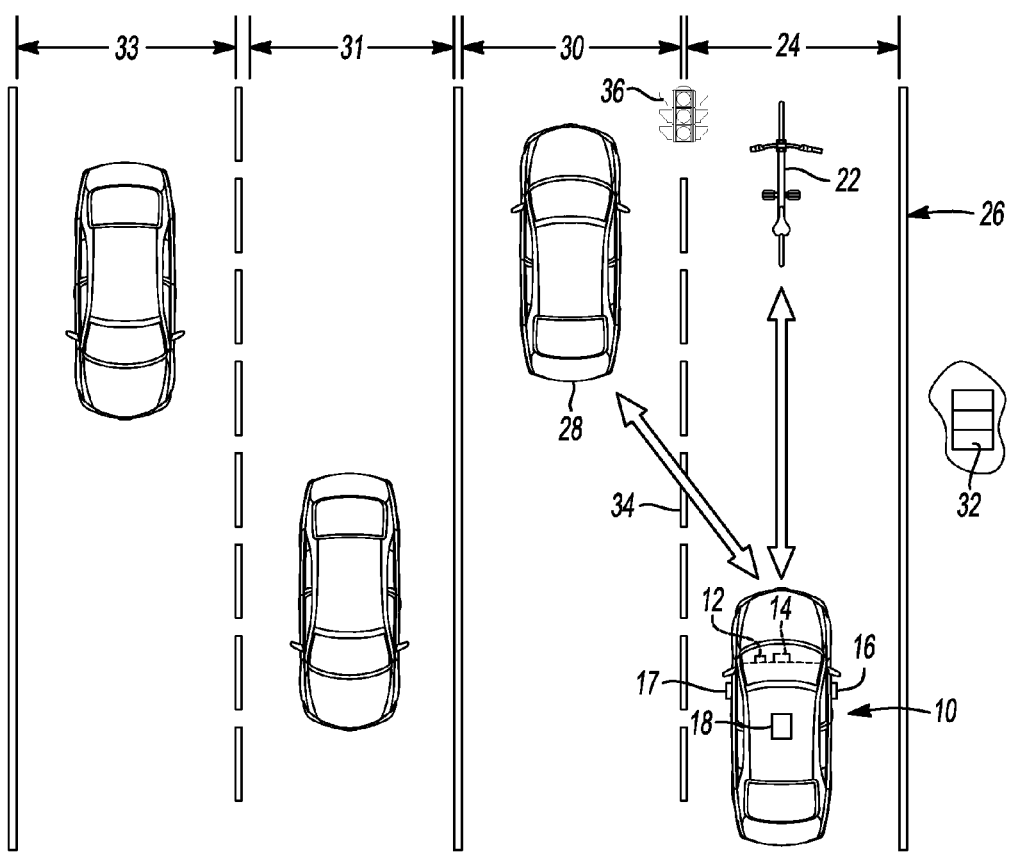
FIG. 2 is a diagrammatic view of a vehicle detecting an object using a DSRC transceiver.
Figure 3:
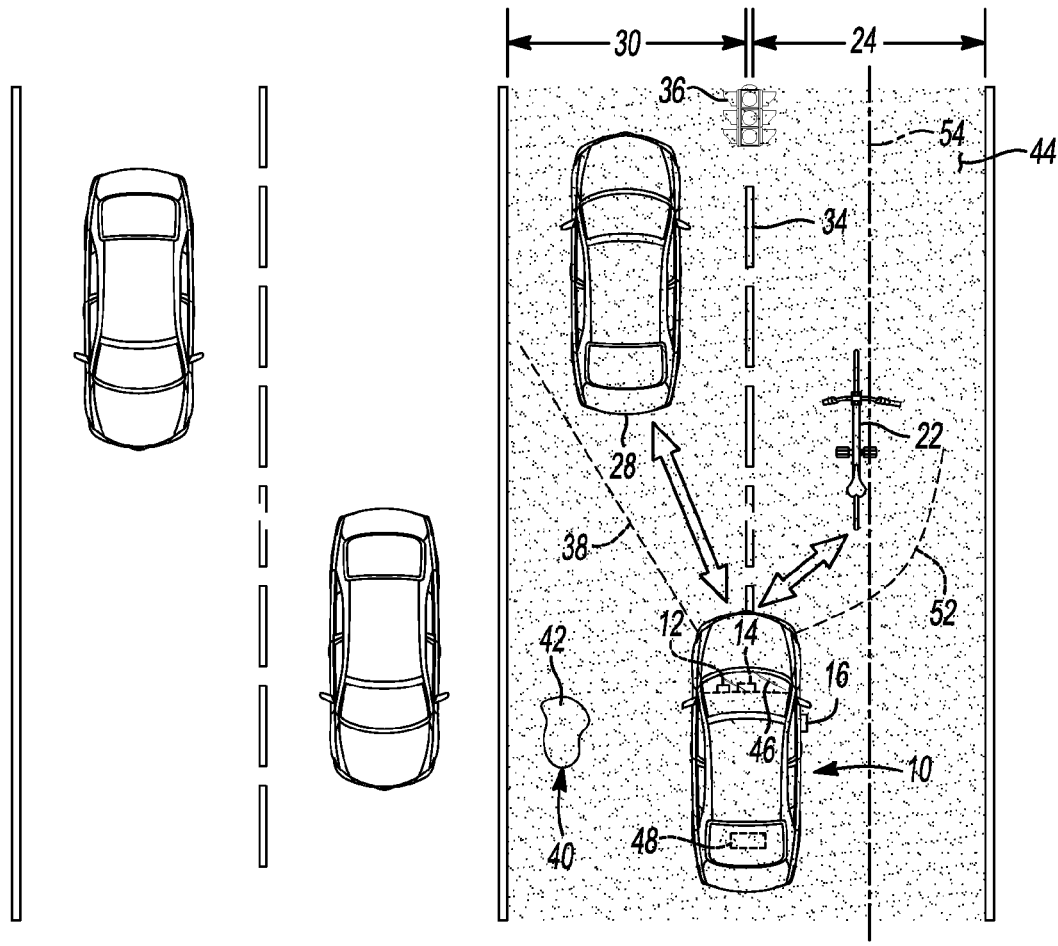
FIG. 3 is a diagrammatic view of a vehicle generating a trajectory to pass the object.

Referring to FIGS. 2 and 3, a schematic depiction of the vehicle 10 using the collision avoidance system 12 is shown. FIG. 2 depicts identification of a cyclist 22 within a first lane 24 of a road 26 and an adjacent vehicle 28 within a second lane 30 of the road 26. FIG. 3 depicts the vehicle 10 executing the maneuver from the first lane 24 into the second lane 30 based on the information exchange between the adjacent vehicle 28 and the cyclist 22. As will be discussed in more detail below, the collision avoidance system 12 communicates with the controller 14 and the communication transceiver 16 to obtain and analyze information to safely execute a vehicle maneuver avoiding the cyclist 22.

FIG. 2 depicts identification of the cyclist 22 and arbitration between the collision avoidance system 12, the controller 14, and the transceiver 16. As the vehicle 10 approaches the cyclist 22, the transceiver 16 receives data broadcast from the cyclist 22 indicating the cyclist's 22 presence. In at least one embodiment, the transceiver 16 uses dedicated short range communication to receive the data from the cyclist 22. This allows the transceiver 16 to begin receiving input data from the cyclist 22 within a range of approximately 300 m. Once a cyclist 22 has been identified by the transceiver 16, the collision avoidance system 12 may use the vision system 17, as described above, to confirm the presence of the cyclist 22. The vision system 17 confirms the presence of the cyclist 22 as to vehicle 10 approaches and comes within range of the vision system 17.

The transceiver 16 may communicate data received from the cyclist 22 such as the location and speed of the cyclist 22 to the collision avoidance system 12. The vision system 17 also transmits the location of the cyclist 22 to the collision avoidance system 12. Use of both the transceiver 16 and the vision system 17 gives the collision avoidance system 12 an accurate representation of at least the location of the cyclist 22. The navigation system 18 may also provide map data to the collision avoidance system 12. For example, the navigation system 18 may be configured to transmit map data from an external server 32 to instruct the collision avoidance system 12. Map data from the navigation system 18 may include, but is not limited to, an indication of the first lane 24 and the second lane 30. The navigation system 18 instructs the collision avoidance system 12 if the first lane 24 may also be considered a bike lane for the cyclist 22. Likewise, the navigation system 18 may instruct the collision avoidance system 12 if the first lane 24 may be considered a traveling lane for the vehicle 10. While the road 26 is depicted as having a first lane 24 and a second lane 30, the navigation system 18 may also be configured to determine any number of lanes on the road 26, such as a third lane 31 and a fourth lane 33.

The collision avoidance system 12 compares the location data of the cyclist 22 from the transceiver 16 and the vision system 17 and the map data from the navigation system 18 to determine the location of the cyclist 22 within the first lane 24. While depicted as a cyclist 22, the transceiver 16 and vision system 17 with the navigation system 18 may be able to instruct the collision avoidance system 12 of any other object's existence that may impede the vehicle 10. Once the collision avoidance system 12 identifies that the cyclist 22 is traveling in the first lane 24 and impeding the vehicle 10, the collision avoidance system 12 analyzes the road 26. For example, using the navigation system 18 and the vision system 17, the collision avoidance system 12 determines a roadway characteristic 34, such as lane markings.

As stated above, the navigation system may instruct the collision avoidance system 12 as to the number of lanes on the road 26 as well as the type of road 26 the vehicle 10 is traveling. The vision system 17 may be used to identify and confirm the type of lane markings 34 on the road 26. For example, the navigation system 18 may instruct the collision avoidance system 12 that the vehicle 10 is traveling on a highway and the vision system 17 may identify the dashed yellow lines consistent with the lane markings of a highway. The vision system 17 may also be used to identify any other type of lane marking commonly used on the road 26, such as but not limited to, double yellow lines, single white lines, or a single yellow line with an adjacent dashed yellow line.

The collision avoidance system 12 uses the roadway characteristics 34 from the navigation system 18 and the vision system 17 to analyze a roadway environment 36. The collision avoidance system 12 may use input from the transceiver 16 to determine and analyze the current roadway environment 36. The transceiver 16, as stated above, may also be used to transmit data from an adjacent vehicle 28, or from any other infrastructure that uses dedicated short range communication. For example, the roadway environment 36 may include data from traffic lights, stop signs, or any other infrastructure used to affect maneuvers of the vehicle 10. The collision avoidance system 12 uses the roadway characteristics 34 and the roadway environments 36 determined from the transceiver 16, the vision system 17, and the navigation system 18 to analyze the environment around and external to the vehicle 10.

FIG. 3 continues to depict arbitration between the collision avoidance system 12, the controller 14, and the transceiver 16, as well as depicting maneuver execution of the vehicle 10. After analyzing the environment external to the vehicle 10, the collision avoidance system 12 determines a potential trajectory 38 for the vehicle 10. The potential trajectory 38 may be based on the roadway environment 36 and the roadway characteristics 34 to determine a safe maneuver for the vehicle 10 avoiding the cyclist 22. The potential trajectory 38 may be analyzed by the collision avoidance system 12 and include instances such as crossing into the second lane 30 or biasing the vehicle 10 within the first lane 24. These determinations are again evaluated based on the roadway characteristics 34 and the roadway environments 36, as discussed above. For example, the collision avoidance system 12 verifies that the potential trajectory 38 will not intersect with the adjacent vehicle 28 or the cyclist 22. Likewise, the collision avoidance system 12 verifies that the potential trajectory 38 is a legal and safe maneuver for the vehicle 10. For example, the collision avoidance system 12 verifies that the potential trajectory 38 does not cross double yellow center lane markings or does not pass while crossing an intersection at a stoplight.

Collision avoidance system 12 may also generate the potential trajectory 38 based on a conditional state 40 of the road 26. For example, the collision avoidance system 12 may receive data from the transceiver 16 indicative of a roadway intrusion 42, such as a pothole or present construction. Likewise, the collision avoidance system 12 may receive data from the navigation system 18 indicative of a roadway condition 44, such as a recent rain or ice formation. The controller 14 may also receive input from external vehicle sensors 46 to allow the collision avoidance system to verify the roadway condition 44. For example, a rain or temperature sensor and an ultrasonic sensor may allow the controller 14 to instruct the collision avoidance system 12 as to potential road intrusions 42 or roadway conditions 44. The collision avoidance system 12 uses the data indicative of the roadway environment 36, the roadway characteristics 34, the roadway intrusions 42, and the roadway conditions 44 to indicate a probability that the potential trajectory 38 will result in a safe and executable maneuver for the vehicle 10. If the probability of the potential trajectory 38 is above a preset threshold, the collision avoidance system 12 may begin instructing the controller 14 to execute a maneuver for the vehicle 10. Likewise, if the probability of the potential trajectory 38 is below the preset threshold, the collision avoidance system 12 aborts the maneuver. This will be discussed in more detail with reference to FIG. 4.

If maneuvering the vehicle 10 is probable, the collision avoidance system 12 indicates to an occupant of the pending maneuver. The collision avoidance system 12 may instruct the controller 14 to actuate an indicator 48 within a cabin 50 of the vehicle 10. The indicator 48 may be any human machine interface component within the vehicle, such as but not limited to, an auditory warning, a visual warning, or haptic feedback provided to an occupant of the vehicle 10. For example, the indicator 48 may include illuminating lights, producing a tone, or vibrating a vehicle component, such as a steering wheel (not shown), a pedal (not shown), or a seat (not shown). The indicator 48 may be active during all instances of execution and may use a single indication, or multiple indications throughout the maneuver execution. For example, the controller 14 may actuate the indicator 48 to illuminate a light indicating the presence of the cyclist 22.

The controller 14 may then actuate the indicator 48 to produce a tone alerting the occupant that the potential trajectory 38 may either be executed or not executed to avoid the cyclist 22. The controller 14 may also actuate the indicator 48 to provide haptic feedback on the steering wheel to alert the occupant that the vehicle 10 is crossing into the second lane 30. The indicator 48 may also be indicative of execution of the maneuver. As by examples, the light may illuminate in the shape of a bicycle, the tone may give auditory instructions to the occupant, and the haptic feedback may be present on a side of the steering wheel adjacent to where the potential trajectory 38 may be maneuvering. By actuating the indicator 48 through all stages of execution, the collision avoidance system 12 also allows an occupant to abort the potential trajectory 38.

If the probability of the potential trajectory 38 is above the threshold and an occupant has not aborted the potential trajectory 38 based on the indicator 48, the collision avoidance system 12 maneuvers the vehicle 10. The collision avoidance system 12 maneuvers the vehicle 10 using the controller 14. The controller 14 may actuate vehicle systems, such as but not limited to, the steering system and the brake and accelerator pedal position systems. The controller 14 may instruct the steering system and the brake accelerator pedal position systems based upon input received from sensors within the systems. For example, the controller 14 may adjust a steering angle of the steering wheel based on input from a steering angle sensor as compared to the potential trajectory 38 provided by the collision avoidance system 12. Likewise, the controller 14 may adjust a brake pedal position or an accelerator pedal position based on input from a wheel speed sensor or accelerometer as compared to the potential trajectory 38 provided by the collision avoidance system 12. The controller 14, through use of the steering system and the brake and pedal position systems, may be a lateral positioning controller 14. The lateral positioning controller 14 uses inputs from various vehicle systems, as described above, to safely and accurately maneuver the vehicle 10 around the cyclist 22 according to the potential trajectory 38 as provided by the collision avoidance system 12.

The collision avoidance system 12 may constantly monitor the controller 14, the transceiver 16, the vision system 17, and the navigation system 18. The collision avoidance system 12 constantly receives data from the transceiver 16, the vision system 17, and the navigation system 18 to allow for compensation during execution of the potential trajectory 38. For example, the adjacent vehicle 28 and/or the cyclist 22 may suddenly and unexpectedly change speed or alter positions. The change in speed or altering of positions of the adjacent vehicle 28 and/or the cyclist 22 may make the potential trajectory 38 unsatisfactory. By constantly monitoring, the collision avoidance system 12 may use the transceiver 16, the vision system 17, and the navigation system 18 to change or abort the potential trajectory 38 based upon updated input data from the transceiver 16, the vision system 17, and the navigation system 18. Constant monitoring also allows the collision avoidance system 12 to be adaptable based on the roadway environment 36, the roadway characteristics 34, the roadway intrusions 42, and the roadway conditions 44. The collision avoidance system 12 uses these inputs to abort the potential trajectory 38 if the controller 14 has not yet begun maneuvering, or to generate a second trajectory 52, if necessary.

The second trajectory 52 may return the vehicle 10 to the first lane 24, or may continue to pass the cyclist 22 if the collision avoidance system 12 determines, based on the inputs described above, that passing cyclist 22 is feasible. For example, the second trajectory 52 may include returning the vehicle 10 to a center 54 of the first lane 24 and instructing the controller 14 to adjust the speed of the vehicle 10 by changing a brake pedal position. The second trajectory 52 may also include a biasing position of the vehicle 10 away from a center 54 of the first lane 24 and crossing into the second lane 30 after the adjacent vehicle 28 has passed. The collision avoidance system 12 works in conjunction with the controller 14, the transceiver 16, the vision system 17, and the navigation system 18 to account for and adapt to unexpected events that may occur during normal vehicle operation.

Further, while passing the cyclist 22, the collision of avoidance system 12 may instruct the controller 14 to adjust vehicle features to ensure safe passage of the cyclist 22. For example, the collision avoidance system 12 may instruct the controller 14 to lower a windshield wiper speed to avoid wiping excess water from the windshield onto the cyclist 22. By instructing the controller 14 to adjust various vehicle features, the collision avoidance system ensures that the cyclist 22 is not surprised by the passing vehicle 10 and is able to maintain control as the vehicle 10 passes the cyclist 22. The collision avoidance system 12 ensures that the vehicle 10 safely maneuvers around the cyclist 22.

FIG. 4 depicts a flow chart of the control logic used by the collision avoidance system 12. The collision avoidance system 12 uses control logic to operate as described above. However, the collision avoidance system 12 may also segment the control logic. For example, the collision avoidance system 12 may also be configured to only generate the warnings as described above, or utilize lane positioning as described above. Likewise, the control logic for the collision avoidance system 12 is described as sequential, however may be operated simultaneously. Operation of the collision avoidance system 12 may be accomplished using the steps described below in any manner or fashion that allows the collision avoidance system 12 to operate as discussed.

As described above, the collision avoidance system 12 constantly monitors inputs from the transceiver, the controller, the navigation system, and the vision system at 60. The collision avoidance system 12 processes these inputs at 62 consistent with the above description. Data processing at 62 allows the collision avoidance system 12 to decide if the vehicle is approaching the cyclist at 64. If at 64 the collision avoidance system 12 determines that the vehicle is not approaching the cyclist, the collision avoidance system returns to continually process the input data at 62. Continual processing of the input data at 62 allows the collision avoidance system 12 to work continuously to monitor the environment of the vehicle. If at 64 the collision avoidance system 12 determines that the vehicle is approaching the cyclist, the collision avoidance system 12 alerts an occupant of the pending approach at 66. As stated above, the alert at 66 may be an audible tone at a given frequency or auditory message spoken in a language of the occupant. In at least one other embodiment, the alert may be a visual indicator, such as illuminating a light, or a physical indicator such as haptic feedback on a seat, steering wheel, or pedal. Alerting the occupant at 66 allows the collision avoidance system 12 to inform the occupant of a possible pending maneuver.

The collision avoidance system 12 uses the inputs described above to determine if crossing into an adjacent lane is necessary at 68. If the collision avoidance system 12 determines that crossing into an adjacent lane at 68 is not necessary, the collision avoidance system 12 determines if the current traveling lane of the vehicle is clear of other obstacles at 70. If at 70 the current traveling lane is not clear of other obstacles, then the collision avoidance system 12 alerts the occupant that executing the maneuver may not be safe at 72. As stated above, the alert at 72 may be an audible tone at a given frequency or auditory message spoken in a language of the occupant. In at least one other embodiment, the alert may be a visual indicator, such as illuminating a light, or a physical indicator such as haptic feedback on a seat, steering wheel, or pedal. After the collision avoidance system 12 aborts a potential maneuver at 72, the control logic returns to again process the input data at 62. If however the collision avoidance system 12 determines at 70 that the traveling lane is clear of other obstacles, the collision avoidance system 12 may dynamically adjust the position of the vehicle within the current traveling lane at 74. Dynamically adjusting the position of the vehicle at 74 may include biasing the vehicle to either side of the center of the lane and/or adjusting the speed of the vehicle to account for the cyclist. At 76, the collision avoidance system 12 instructs the controller to adjust the vehicle systems necessary to account for the cyclist and the control logic continues to process the input data at 62.

Referring back to 68, if the collision avoidance system 12 determines that crossing into the adjacent lane is necessary, the collision avoidance system 12 uses the inputs and environment as described above to determine if crossing into the adjacent lane is a legal maneuver at 78. If at 78 the collision avoidance system 12 determines that crossing into the adjacent lane is not legal, the collision avoidance system 12 alerts the occupant that a maneuver will not be attempted for legal reasons at 80 and the control logic continues to process the input data at 62. Alerting the occupant at 80 that the maneuver will not be attempted due to legal reasons, allows the occupant an opportunity to verify the accuracy of the determination made by the collision avoidance system 12 at 78. As stated above, the alert at 80 may be an audible tone at a given frequency or auditory message spoken in a language of the occupant. In at least one other embodiment, the alert may be a visual indicator, such as illuminating a light, or a physical indicator such as haptic feedback on a seat, steering wheel, or pedal.

If at 78 the collision avoidance system 12 determines that crossing into the adjacent lane is a legal maneuver, the collision avoidance system then determines if crossing into the adjacent lane constitutes a safe maneuver at 82. Again, the collision avoidance system 12 makes a determination that execution of a possible maneuver is safe at 82 based on inputs received from the vehicle systems indicative of the surrounding vehicle environment, the roadway characteristics, possible roadway of obtrusion, and the roadway condition. If the collision avoidance system 12 determines that crossing into the adjacent lane is not safe at 82, the collision avoidance system 12 instructs the controller to alert the occupant that a maneuver will not be attempted due to safety considerations at 84 and the control logic continues to process the input data at 62. Alerting the occupant that a maneuver may not be executed due to safety considerations at 84 allows the occupant to verify the accuracy of the determination made by the collision avoidance system 12 at 82. This allows the occupant to override the determination at 82 and eliminates potential error of the collision avoidance system 12. As stated above, the alert at 84 may be an audible tone at a given frequency or auditory message spoken in a language of the occupant. In at least one other embodiment, the alert may be a visual indicator, such as illuminating a light, or a physical indicator such as haptic feedback on a seat, steering wheel, or pedal.

If at 82 the collision avoidance system 12 determines that a maneuver may be attempted, the collision avoidance system alerts the occupant that the vehicle will execute the maneuver based on the calculated trajectory at 86. As stated above, the alert at 86 may be an audible tone at a given frequency or auditory message spoken in a language of the occupant. In at least one other embodiment, the alert may be a visual indicator, such as illuminating a light, or a physical indicator such as haptic feedback on a seat, steering wheel, or pedal. Alerting the occupant that a vehicle maneuver will be attempted at 86 allows the occupant an opportunity to abort the maneuver. The collision avoidance system 12 will monitor preset vehicle system inputs indicative of an occupant-initiated abortion of the maneuver and determine at 88 if the occupant has signaled to abort the maneuver. The preset vehicle system inputs indicative of an occupant-initiated abortion may include, but are not limited to, depressing the brake pedal, a voice recognition feature for the occupant, or using a human machine interface to select a button on a display.

If at 88 the collision avoidance system 12 receives input of an occupant-initiated abortion, the maneuver will not be executed and the control logic continues to process the input data at 62. However, if at 88 the collision avoidance system 12 does not receive input of an occupant-initiated abortion, then at 90 the collision avoidance system 12 will instruct the controller to use lateral position control and partially move into the adjacent lane, or move completely into the adjacent lane avoiding the cyclist. The collision avoidance system 12 will automatically steer the vehicle to avoid the collision on a path that is based on map data from the navigation system identifying a marking type for the traveling lane.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A system comprising:
a controller configured to, in response to receiving location and speed data from other vehicles indicating an expected collision absent a trajectory change, steer a vehicle to avoid the collision on a path that is based on map data identifying a marking type for a traveling lane such that the path crosses the lane when the marking type is broken and does not cross the lane when the marking type is solid.

2. The system of claim 1, wherein the controller is further configured to generate an alert of the steering.

3. The system of claim 2, wherein the alert is haptic feedback that is provided on an area of a steering wheel in a direction of the path.

4. The system of claim 2, wherein the alert is an audible tone having a constant frequency.

5. The system of claim 2, wherein the alert is a visual status indicator light within the vehicle.

6. A vehicle comprising:
a steering wheel; and
a controller configured to, in response to receiving location and speed data from other vehicles indicating an expected collision absent a trajectory change, automatically control the steering wheel to direct the vehicle along a collision avoidance path that is based on map data identifying a marking type for a traveling lane such that the path crosses the lane when the marking type is broken and does not cross the lane when the marking type is solid.

7. The vehicle of claim 6 further comprising a dedicated short range communication transceiver configured to receive the location and speed data.

8. The vehicle of claim 6, wherein the controller is further configured to, in response receiving stop light status data, adjust the collision avoidance path to account for the stop light status data.

9. The vehicle of claim 6, wherein the controller is further configured to, in response to the marking type being solid, brake the vehicle.

10. A control method for a vehicle comprising:
in response to receiving data from other vehicles indicating an expected collision absent a trajectory change, automatically steering the vehicle to avoid the collision on a path that is based on data identifying a marking type for a traveling lane such that the path crosses the lane when the marking type is broken and does not cross the lane when the marking type is solid.

11. The control method of claim 10, wherein the path crosses the lane when the marking type is broken into an adjacent lane.

12. The control method of claim 10, wherein the path is such that a position of the vehicle is biased within the traveling lane to avoid the expected collision.

13. The control method of claim 10, wherein the path is such that a speed of the vehicle is adjusted to account for an object within the traveling lane.

14. The control method of claim 10 further comprising receiving additional data from the other vehicles and automatically steering the vehicle onto another path.

15. The control method of claim 10 further comprising, in response to receiving data indicating an occupant-initiated abort request, cancel the automatically steering.

* * * * *